US011892142B2

(12) United States Patent
Tabor

(10) Patent No.: US 11,892,142 B2
(45) Date of Patent: *Feb. 6, 2024

(54) LIGHT FIXTURE INSTALLATION ADAPTERS AND METHODS THEREOF

(71) Applicant: Nathan Tabor, Kernersville, NC (US)

(72) Inventor: Nathan Tabor, Kernersville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,359

(22) Filed: Nov. 22, 2022

(65) Prior Publication Data

US 2023/0088623 A1 Mar. 23, 2023

Related U.S. Application Data

(63) Continuation of application No. 17/487,794, filed on Sep. 28, 2021, now Pat. No. 11,536,426.

(60) Provisional application No. 63/085,367, filed on Sep. 30, 2020.

(51) Int. Cl.

*F21S 8/04* (2006.01)
*F21V 21/34* (2006.01)
*F21V 21/04* (2006.01)
*F21V 21/03* (2006.01)

(52) U.S. Cl.

CPC ............ *F21S 8/043* (2013.01); *F21V 21/047* (2013.01); *F21V 21/34* (2013.01); *F21V 21/03* (2013.01)

(58) Field of Classification Search

CPC ......... F21S 8/043; F21V 21/047; F21V 21/34
See application file for complete search history.

(56) References Cited

U.S. PATENT DOCUMENTS

| | | | | |
|---|---|---|---|---|
| 4,327,402 | A | 4/1982 | Aubrey | |
| 6,550,727 | B2 | 4/2003 | Butterfield et al. | |
| 8,382,415 | B1 | 2/2013 | Goldbaum | |
| 8,814,459 | B1 | 8/2014 | Berge | |
| 9,957,996 | B2 | 5/2018 | Burton | |
| 10,520,171 | B1 * | 12/2019 | Kotovsky | F21V 21/02 |
| 10,634,322 | B1 | 4/2020 | Hsu | |

(Continued)

FOREIGN PATENT DOCUMENTS

| | | | | |
|---|---|---|---|---|
| DE | 102017108414 | A1 | 9/2018 | |
| EP | 1 248 036 | A1 | 9/2002 | |

OTHER PUBLICATIONS

Plug-In Technology for Lighting and Fans, SQL Technologies, https://www.safetyquicklight.com/technology, Accessed and downloaded on Sep. 7, 2020.

*Primary Examiner* — Alexander K Garlen
(74) *Attorney, Agent, or Firm* — Olive Law Group, PLLC

(57) ABSTRACT

Light fixture installation adapters and methods thereof are disclosed. According to an aspect, a light fixture installation adapter includes a first bracket configured to be attached to a light fixture. The adapter also includes a second bracket configured to be attached to an electrical junction box. Further, the adapter includes a mounting assembly that has a first component and a second component attached to the first bracket and the second bracket, respectively. The first component is configured to engage with and to attach to the second component when the first component is oriented in a predetermined position with respect to the second component and when the first component is moved in one or more predetermined directions with respect to the second component for attaching the first bracket to the second bracket via the mounting assembly.

10 Claims, 9 Drawing Sheets

(56) References Cited

U.S. PATENT DOCUMENTS

| | | | |
|---|---|---|---|
| 11,029,005 | B1 | 6/2021 | Hsu |
| 2009/0280673 | A1 | 11/2009 | Kohen |
| 2012/0266449 | A1 | 10/2012 | Krupa |
| 2018/0372284 | A1 | 12/2018 | Danesh et al. |
| 2019/0312396 | A1 | 10/2019 | Kohen |
| 2020/0373747 | A1 | 11/2020 | Kay et al. |
| 2021/0231296 | A1 * | 7/2021 | Ninomiya ................ F21S 8/03 |
| 2021/0364154 | A1 | 11/2021 | Yaphe et al. |

* cited by examiner

LIGHT FIXTURE INSTALLATION ADAPTERS AND METHODS THEREOF

CROSS REFERENCE TO RELATED APPLICATIONS

This application claims priority to U.S. Nonprovisional patent application Ser. No. 17/487,794, filed Sep. 28, 2021, and titled LIGHT FIXTURE INSTALLATION ADAPTERS AND METHODS THEREOF, which claims priority to U.S. Provisional Patent Application No. 63/085,367, filed Sep. 30, 2020, and titled LIGHT FIXTURE INSTALLATION ADAPTERS AND METHODS THEREOF; the contents of which are incorporated herein by reference in their entireties.

TECHNICAL FIELD

The presently disclosed subject matter relates generally to light fixtures. Particularly, the presently disclosed subject matter relates to light fixture installation adapters and methods thereof.

BACKGROUND

Light fixtures are common in many residences, office buildings, and even place of manufacture. These devices are typically affixed to a ceiling and powered by electrical wires installed in the ceiling. The ends of the electrical wires extend through a hole in the ceiling where the light fixture is connected to the ends of the electrical wires and attached to the ceiling. The light fixture is oriented for providing light to the room when power to it is turned on.

An electrical junction box is typically placed inside the ceiling hole. The electrical wire ends are routed through a hole in the electrical junction box. The electrical junction box has mounts for attachment of the light fixture.

Light fixture installation can be a cumbersome process for a variety of reasons. For example, often a ladder is needed so that the installer can reach the ceiling where the light fixture is being attached. This can be 8 feet or higher from the floor, so it is desirable for the installation to be as quickly and easily as possible. However, the attachment mechanism can have many parts that must be connected while the installer is on the ladder at the electrical junction box. Further, the light fixture must sometimes be mounted in a precise position, such as flush against the ceiling, such that it is visually appealing.

In view of the aforementioned needs, there is a desire to provide improved equipment and techniques for light fixture installation.

BRIEF DESCRIPTION OF THE DRAWINGS

Figure 1:
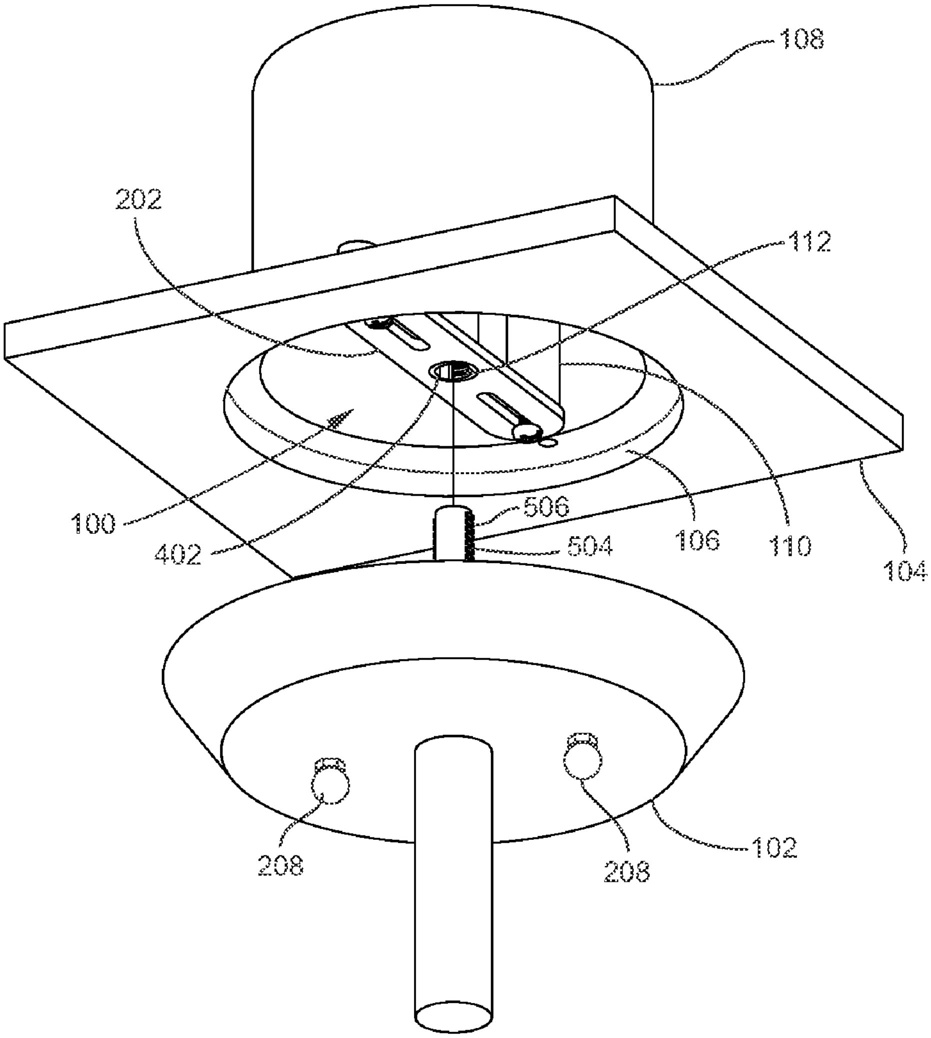
Figure 2:
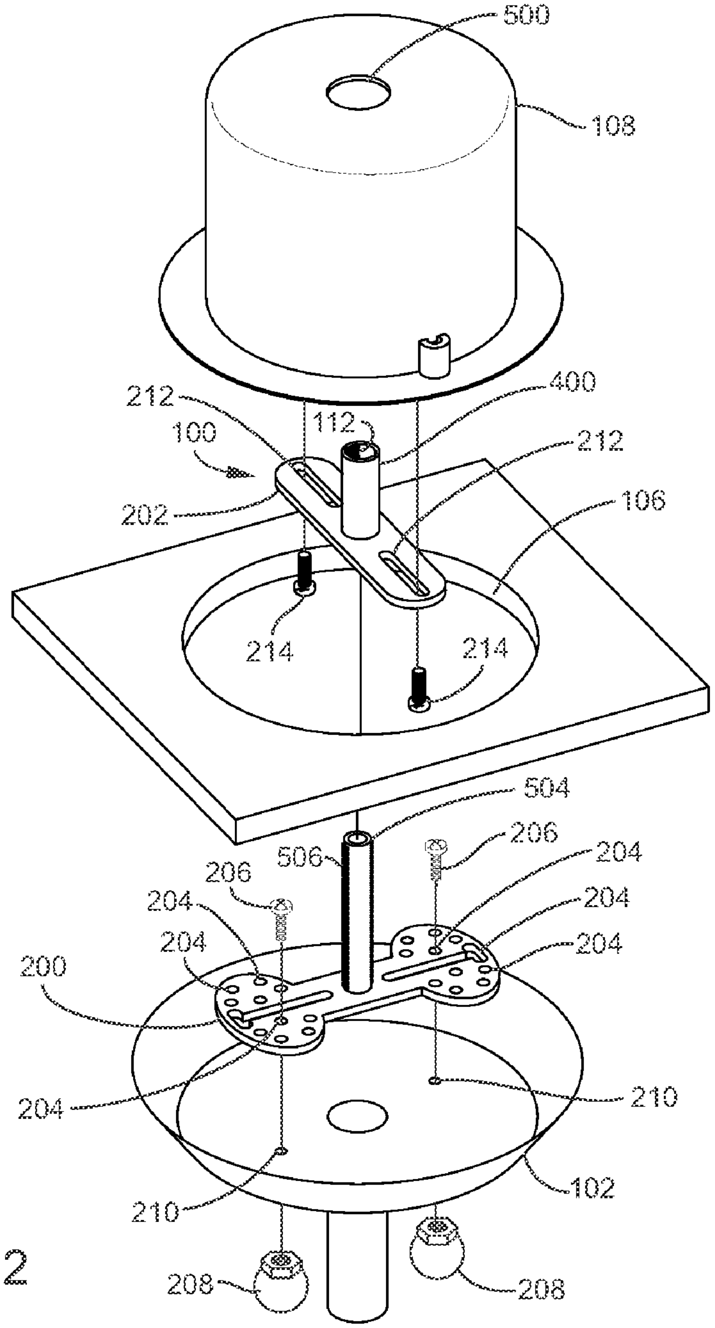
Figure 3:
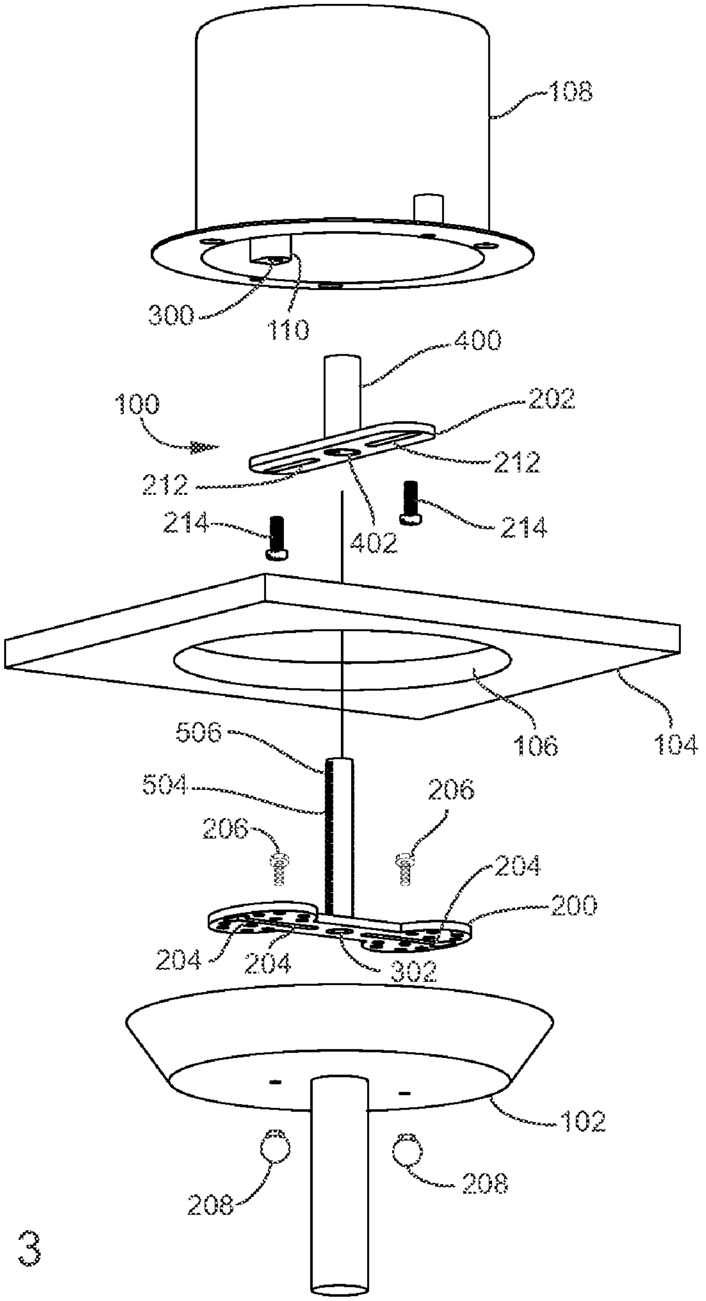
Figure 4:
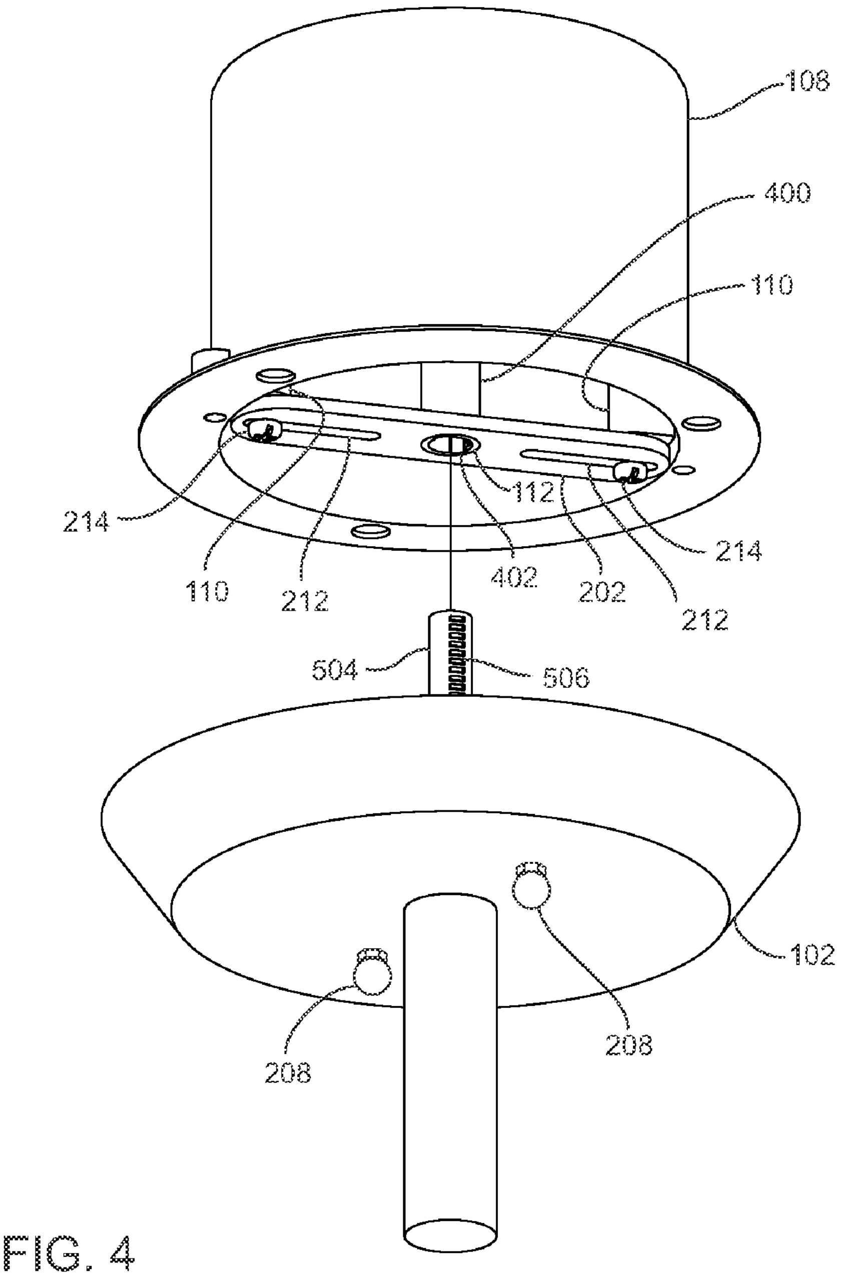
Figure 5:
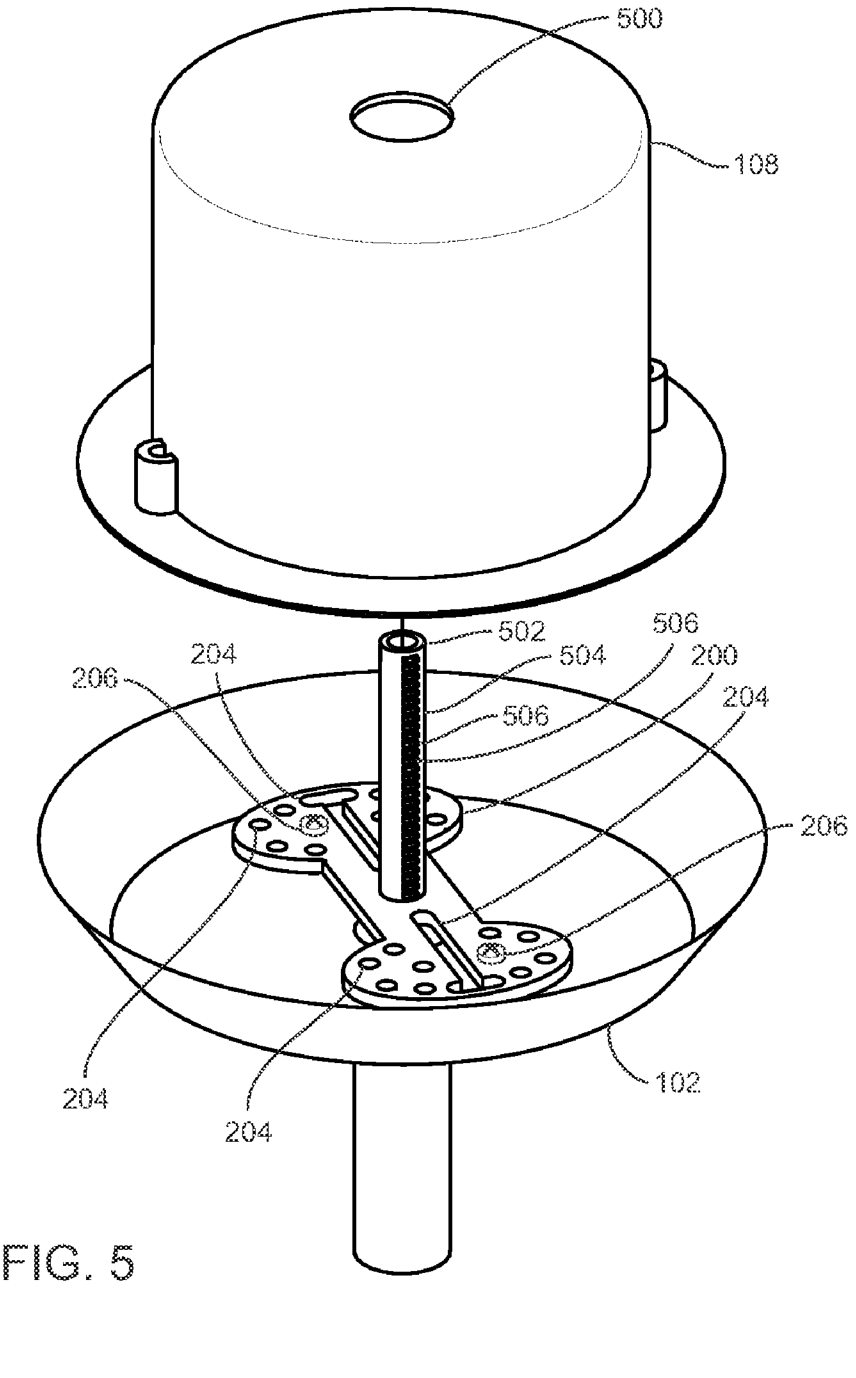
Figure 6A:
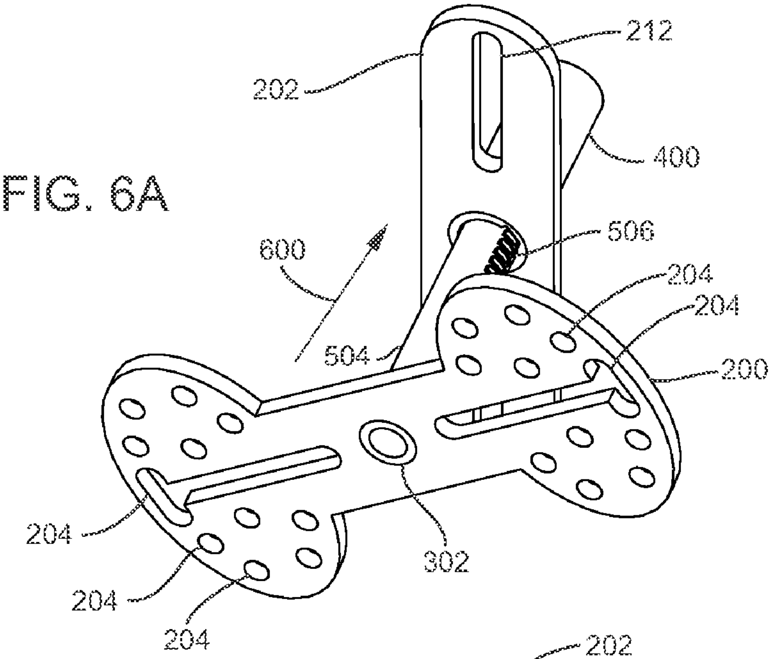
Figure 6B:
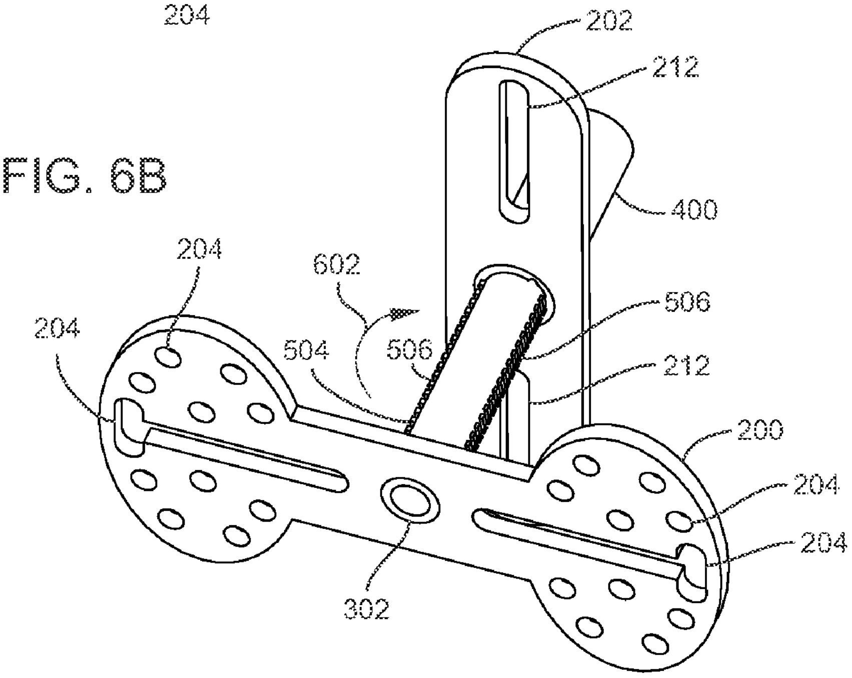
Figure 7:
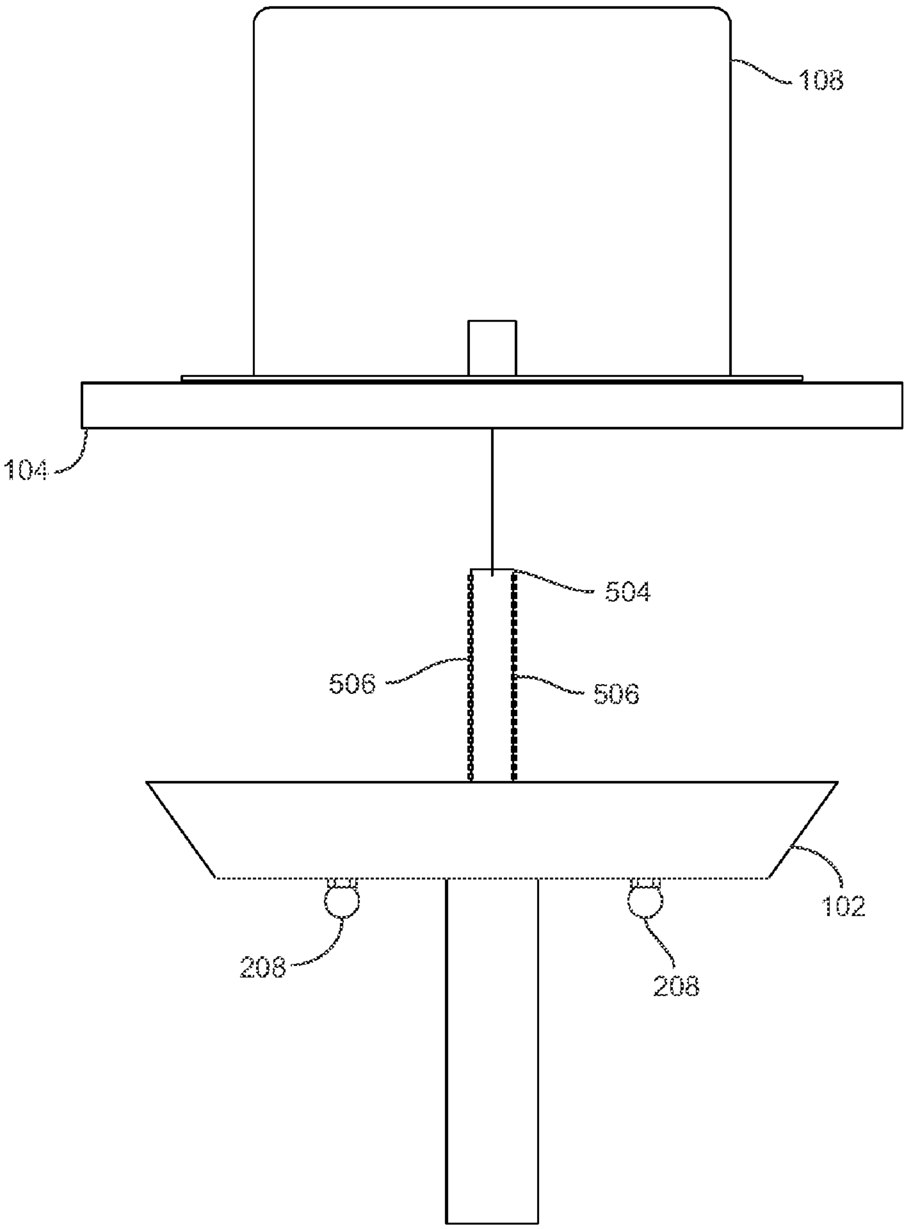
Figure 8:
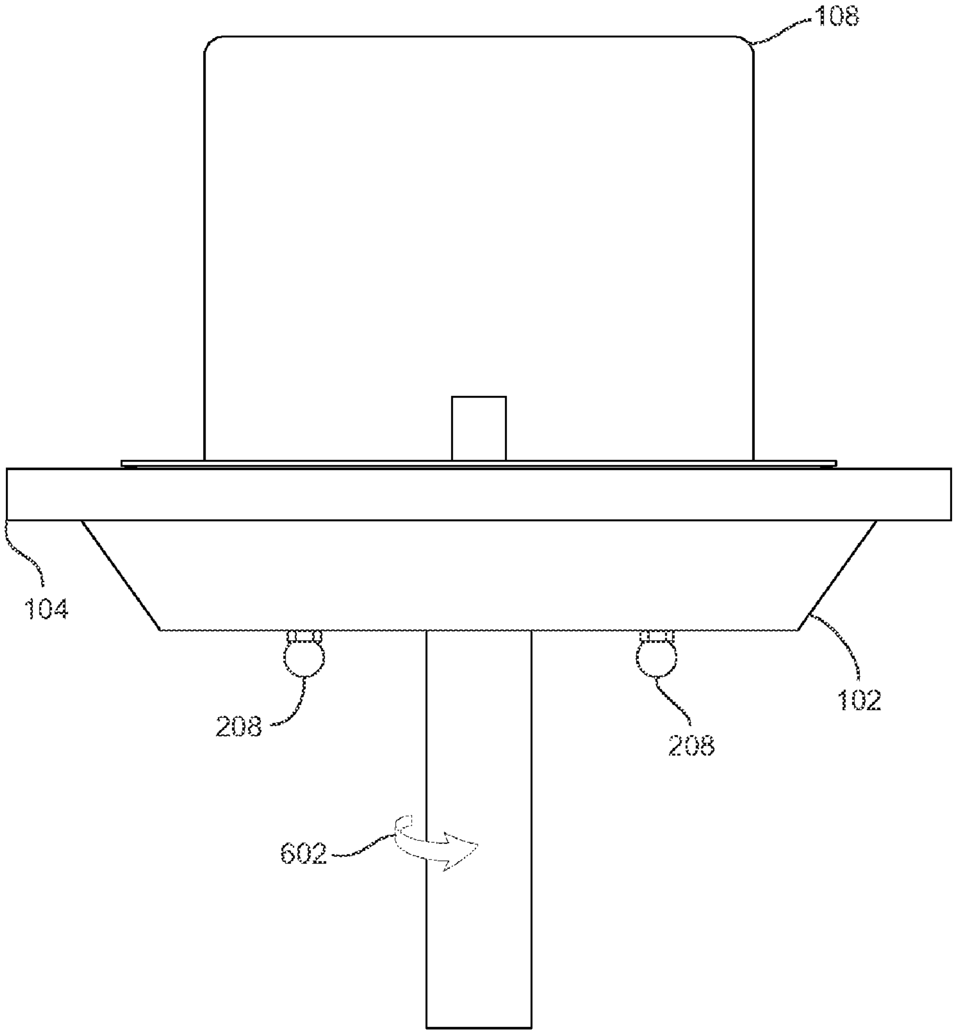
Figure 9:
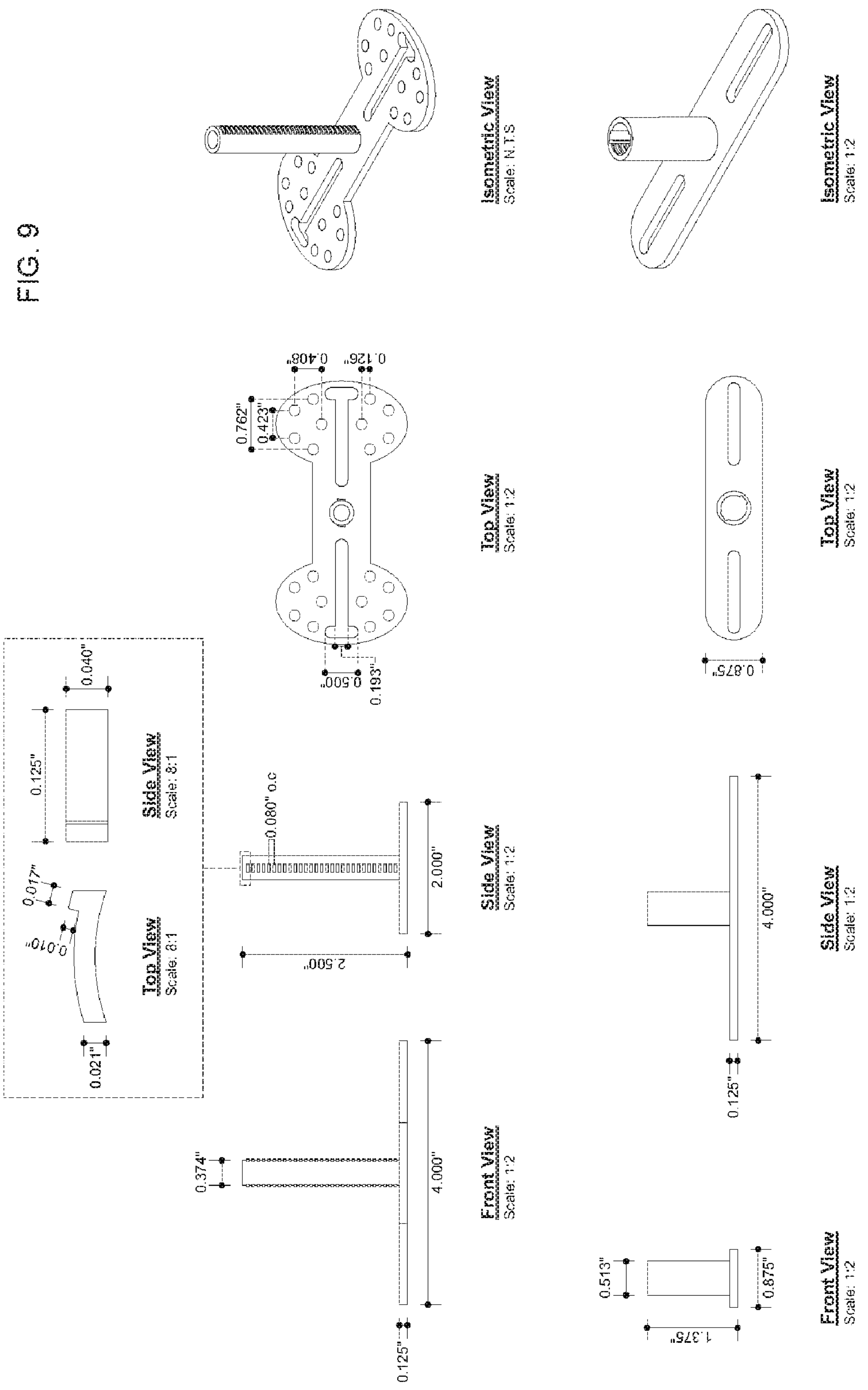

Having thus described the presently disclosed subject matter in general terms, reference will now be made to the accompanying Drawings, which are not necessarily drawn to scale, and wherein:

FIG. 1 is a bottom perspective view of a light fixture installation adapter in use for installing a light fixture to a ceiling in accordance with embodiments of the present disclosure;

FIGS. 2 and 3 are exploded views of the adapter, light fixture, ceiling, and electrical junction box shown in FIG. 1;

FIG. 4 is a bottom perspective view of the adapter, light fixture, ceiling, and electrical junction box shown in FIGS. 1-3;

FIG. 5 is a top perspective view of the adapter, light fixture, ceiling, and electrical junction box shown in FIGS. 1-3;

FIGS. 6A and 6B are bottom perspective views of the upper bracket and the lower bracket and steps for attaching them to each other in accordance with embodiments of the present disclosure;

FIG. 7 is a side view showing the electrical junction box with the component aligned for installation and connection to the component of the upper bracket before upward movement in accordance with embodiments of the present disclosure;

FIG. 8 is a side view showing the light fixture attached to the electrical junction box in accordance with embodiments of the present disclosure; and FIG. 9 are different view of an example light fixture with labeling of example dimensions in accordance with embodiments of the present disclosure.

SUMMARY

The presently disclosed subject matter relates to light fixture installation adapters and methods thereof. According to an aspect, a light fixture installation adapter includes a first bracket configured to be attached to a light fixture. The adapter also includes a second bracket configured to be attached to an electrical junction box. Further, the adapter includes a mounting assembly that has a first component and a second component attached to the first bracket and the second bracket, respectively. The first component is configured to engage with and to attach to the second component when the first component is oriented in a predetermined position with respect to the second component and when the first component is moved in one or more predetermined directions with respect to the second component for attaching the first bracket to the second bracket via the mounting assembly.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

FIG. 1 illustrates a bottom perspective view of a light fixture installation adapter 100 in use for installing a light fixture 102 (only a portion of which is shown for ease of illustration) to a ceiling 104 (only a square-shaped portion of which is shown for ease of illustration) in accordance with embodiments of the present disclosure. It is noted that the view of FIG. 1 may be that of an installer located on a ladder at an angle for installing the light fixture 102. Referring to FIG. 1, the ceiling 104 has a hole 106 defined therein and inside of which an electrical junction box 108 is located. The electrical junction box 108 is configured to receive electrical wires for operably connecting to and providing power to the light fixture 102. Further, the electrical junction box 108 is suitably installed in the ceiling for supporting the weight of the light fixture 102. Further, the electrical junction box 108 includes a mounting portion 110 configured to engage and secure to the adapter 100 as will be described in more detail herein.

Now turning to FIGS. 2 and 3, these figures illustrate exploded views of the adapter 100, light fixture 102, ceiling 106, and electrical junction box 108 shown in FIG. 1. The exploded views are provided for ease of illustration of the assembly of the adapter 100, light fixture 102, ceiling 106, and electrical junction box 108 in accordance with embodiment of the present disclosure.

The adapter 100 includes a lower bracket 200 and an upper bracket 202 configured to be attached to the light fixture 102 and the electrical junction box 108, respectively. The lower bracket 200 includes multiple apertures (or holes) 204 for receipt of more screws 206 for suitably attaching the lower bracket 200 to the light fixture 102. In this example, 2 screws 206 are used for attaching the lower bracket 200, but it should be recognized that any number and type of screw or other mechanism may be used for attaching the lower bracket 200 to the light fixture 102. Further in this example, decorative nuts 208 are used for threading to the screws 206 and for affixing the light fixture 102 to the lower bracket 200. It is also noted that the light fixture 102 includes 2 apertures 210 through which the screws 206 can be inserted as will be understood by those of skill in the art.

It is noted that the lower bracket 200 includes multiple apertures 204 that are in a variety of spaced positions such that the lower bracket 200 may be attached to a variety of different light fixture types. For example, a light fixture may have a particular arrangement of apertures for receipt of screws for attachment of the lower bracket 200. By spacing the apertures 204 in a variety of positions, the lower bracket 200 can be adaptive for attachment to different light fixtures.

The upper bracket 202 includes multiple apertures (or holes) 212 for receipt of more screws 214 for suitably attaching the upper bracket 202 to the electrical junction box 108. In this example, 2 screws 214 are used for attaching the upper bracket 202, but it should be recognized that any number and type of screw or other mechanism may be used for attaching the upper bracket 202 to the electrical junction box 108. Further in this example, the mounting portion 110 (see FIG. 1) of the electrical junction box 108 includes threaded holes 300 (see FIG. 3, which shows only 1 of the 2) for receiving for the screws 214 and for affixing the upper bracket 202 to the electrical junction box 108. It is also noted that the electrical junction box 108 includes 2 holes 300 through which the screws 214 can be inserted as will be understood by those of skill in the art.

It is noted that the upper bracket 202 includes apertures 212 that are elongated in shape such that the upper bracket 202 may be attached to a variety of different electrical junction box types. For example, an electrical junction box may have a particular arrangement of apertures for receipt of screws for attachment of the upper bracket 202. By shaping or spacing the apertures 212 in a variety of different ways, the upper bracket 202 can be adaptive for attachment to different electrical junction boxes.

FIG. 4 illustrates a bottom perspective view of the adapter 100, light fixture 102, ceiling 106, and electrical junction box 108 shown in FIGS. 1-3. Referring to FIG. 4, in this figure the upper bracket 202 is shown as being attached to the electrical junction box 108 by the fastening of the screws 214 to the electrical junction box 108.

FIG. 5 illustrates a top perspective view of the adapter 100, light fixture 102, ceiling 106, and electrical junction box 108 shown in FIGS. 1-3. Referring to FIG. 5, in this figure the bottom bracket 200 is shown as being attached to the light fixture 102 by the fastening of the screws 206 to the light fixture 102.

To install the light fixture 102, the upper bracket 200 can be attached to the electrical junction box 108 as shown in FIG. 4 as an initial step. Further, electrical wires (not shown) extending from the electrical junction box 108 can be suitably connected to the light fixture 102. The electrical wires can be passed through an aperture 500 (shown in FIG. 5) of the electrical junction box 108 and through a passageway inside a component 400 (shown in FIGS. 2 and 4) attached to the upper bracket 202. The electrical wires can be moved to exit an opening 402 of the upper bracket 202. Subsequently, the electrical wires can be passed into an opening 502 (shown in FIG. 5) of a component 504 attached to the lower bracket 200 and through a passageway of the component 504. Further, the electrical wires can exit the passageway of the component 504 via an opening 302 such that it can be connected to the light fixture 102. Subsequently, the upper bracket 202 and the lower bracket 200 can be attached together as described in detail below.

FIGS. 6A and 6B illustrate bottom perspective views of the upper bracket 202 and the lower bracket 200 and steps for attaching them to each other in accordance with embodiments of the present disclosure. Initially, the component 504 of the lower bracket 200 is oriented in a predetermined position with the component 400 of the upper bracket 202 as shown in FIGS. 1, 4, 5, and 7. The lower bracket 200 can subsequently be moved in an upward direction as indicated by direction arrow 600 such that the component 504 engages with component 400 of the upper bracket 202 as shown in FIG. 6A. The component 400 of the upper bracket 202 can be moved in this direction (indicated by direction arrow 600) until the attached light fixture 102 is at a desired position. For example, the component 400 (with attached light fixture 102) may be moved in this direction until the light fixture 102 is flush or touching the ceiling as shown in FIG. 8. Once at the desired position, the component 400 may be rotated as indicated by curved arrow 602 to securely attach the component 400 of the lower bracket 200 to the component 504 of the upper bracket 202.

The component 504 can move freely with respect to component 400 and can securely attach to the component 400 due to features 506 on the outside of component 400 and features 112 the inside passageway of the component 504. In the upward direction (indicated by arrow 600 shown in FIG. 6A), the features 506 and features 112 are positioned such that they do not interfere with each other to inhibit movement in that direction. After rotation as indicated by arrow 602, the features can interlock together and inhibit downward movement of the component 504 and thereby the attached lower bracket 200 and the light fixture 102.

Once rotated as indicated by arrow 602 in FIG. 8, the light fixture 102 is securely attached to the electrical junction box 108. The adapter 100 thus provides an efficient solution for attaching various light fixtures to an electrical junction box.

FIG. 9 illustrates different view of an example light fixture with labeling of example dimensions in accordance with embodiments of the present disclosure.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A light fixture installation adapter comprising:

a first bracket configured to be attached to a light fixture;

a second bracket configured to be attached to an electrical junction box;

a mounting assembly comprising a first component and a second component attached to the first bracket and the second bracket, respectively, wherein the second component defines a receiving structure that defines an opening for receipt of an elongated structure of the first component for restricted movement of the first component along an axis in a substantially upward direction, wherein the first component is configured to engage with and to attach to the second component when the first component is oriented in a predetermined position along the vertical direction with respect to the second component and when the first component is rotated about the axis for attaching the first bracket to the second bracket via the mounting assembly, wherein the first component and the second component define a first set of features and a second set of features, respectively, that are configured to engage one another for the attachment of the first component to the second component, wherein the first set of features are shaped to freely move with respect to the second set of features when the first component is oriented in the predetermined position and the first component moves in the upward direction, wherein the first set of features are positioned on an outside surface of the elongated structure, wherein the second set of features are positioned on an inside surface of the receiving structure, wherein the first set of features comprise a plurality of ledge-shaped structures substantially aligned in vertical direction when the first component is oriented in the predetermined position, and wherein the second set of features comprises a plurality of ledge-shaped structures configured to engage the ledge-shaped structures and to prevent the first component from moving in a downward direction after the first component is moved in the one or more predetermined directions.

2. The light fixture installation adapter of claim 1, wherein the electrical junction box is an in-ceiling, electrical junction box.

3. The light fixture installation adapter of claim 1, wherein the first bracket defines one or more apertures for receipt of one or more screws for attaching the first bracket to the light fixture.

4. The light fixture installation adapter of claim 3, wherein the one or more apertures are each elongated in shape.

5. The light fixture installation adapter of claim 1, wherein the first bracket comprises a first end and an opposing second end, and wherein the first bracket defines a first aperture and a second aperture at the first end and the second end, respectively, for receipt of a respective screw for attaching the first bracket to the light fixture.

6. The light fixture installation adapter of claim 1, wherein the second bracket defines one or more apertures for receipt of one or more screws for attaching the second bracket to the electrical junction box.

7. The light fixture installation adapter of claim 6, wherein the one or more apertures are each elongated in shape.

8. The light fixture installation adapter of claim 1, wherein the second bracket comprises a first end and an opposing second end, and wherein the second bracket defines a first aperture and a second aperture at the first end and the second end, respectively, for receipt of a respective screw for attaching the second bracket to the electrical junction box.

9. The light fixture installation adapter of claim 1, wherein the first set of features securely attaches to the second set of features when the first component is rotated about the axis.

10. The light fixture installation adapter of claim 1, wherein the elongated structure is substantially cylindrical in shape, and wherein the receiving structure defines a substantially cylindrically-shaped interior surface for receiving the elongated structure for permitting rotational movement of the elongated structure within the receiving structure.

* * * * *